US006369946B1

(12) United States Patent
Ishijima et al.

(10) Patent No.: US 6,369,946 B1
(45) Date of Patent: Apr. 9, 2002

(54) IMAGE STABILIZING APPARATUS

(75) Inventors: Toshihisa Ishijima; Kouichi Nagata; Kenichi Takahashi, all of Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/657,182

(22) Filed: Sep. 7, 2000

(30) Foreign Application Priority Data

Sep. 8, 1999 (JP) ........................................... 11-254036

(51) Int. Cl.[7] .......................... G02B 27/64; G03B 17/00

(52) U.S. Cl. ....................... 359/554; 359/407; 359/557; 396/52; 396/55

(58) Field of Search ................................ 359/554–557, 359/407–409, 480, 399; 396/52–55; 348/208

(56) References Cited

U.S. PATENT DOCUMENTS

| | | | | |
|---|---|---|---|---|
| 3,941,001 A | * | 3/1976 | LaSarge | 74/5.2 |
| 4,235,506 A | * | 11/1980 | Saito et al. | 359/556 |
| 4,655,548 A | * | 4/1987 | Jue | 359/874 |
| 5,349,757 A | * | 9/1994 | Renker | 33/316 |
| 5,850,576 A | * | 12/1998 | Matsuzawa | 359/554 |
| 5,978,137 A | | 11/1999 | Takahashi et al. | 359/557 |
| 6,266,190 B1 | * | 6/2001 | Hirunuma et al. | 359/554 |

FOREIGN PATENT DOCUMENTS

| | | | | |
|---|---|---|---|---|
| EP | 834761 | | 4/1998 | |
| JP | 5737852 | | 8/1982 | |
| JP | 6250100 | | 9/1994 | |
| JP | 6-250100 | * | 9/1994 | 359/554 |

* cited by examiner

*Primary Examiner*—Thong Nguyen
(74) *Attorney, Agent, or Firm*—Snider & Associates; Ronald R. Snider

(57) ABSTRACT

In an image stabilizing apparatus in which inner and outer gimbals are pivoted about two pivotal axes so as to fix an erect prism with respect to an inertial system, a torsion coil spring 240 is disposed to provide one-side stressing between the inner and outer gimbals 7, 107, so as to pivotally stress the inner gimbal 7 with respect to the outer gimbal 107 in one direction. When image stabilizing control is started, the elastic force of the torsion coil spring 240 instantly changes the angular position of the inner gimbal 7, so that a capacitor is charged earlier, thereby enhancing the response in PWM control.

11 Claims, 9 Drawing Sheets

IMAGE STABILIZING APPARATUS

RELATED APPLICATIONS

This application claims the priority of Japanese Patent Application No. 11-254036 filed on Sep. 8, 1999, which is incorporated herein by reference.

BACKGROUND OF THE INVENTION

1. Field of the Invention

The present invention relates to an image stabilizing apparatus, disposed within an optical apparatus such as monocular, binoculars, and video camera, for preventing optical images from being observed in a blurred state due to the fluctuation in emission angle of luminous flux from an observation object with respect to the optical axis of the optical apparatus when the optical apparatus is vibrated.

2. Description of the Prior Art

When an optical apparatus aimed at optical observation, such as monocular and binoculars, is operated as being held with a hand, when the optical apparatus is used in an airplane, vehicle, or the like in particular, the vibration or rocking of the airplane, vehicle, or the like is transmitted to the optical apparatus, so that the emission angle of luminous flux from an observation object with respect to the optical axis fluctuates, whereby the optical image to be observed often deteriorates. Even if the vibration transmitted to such an optical apparatus has small amplitude, the angle of fluctuation with respect to the optical axis is enlarged since the field of view is narrow in the monocular, binoculars, and the like, and since the observation object is viewed under magnification therein. Therefore, even at the time of rocking with a relatively low angle fluctuating speed, the observation object may rapidly move within the field of view, and go out of sight when the angle of fluctuation is large, which is inconvenient. At the time of rocking with a relatively high angle fluctuating speed, on the other hand, the angle fluctuating speed of the image of observation object is observed as being increased by the power of optical apparatus even when the fluctuation angle is relatively small, whereby the image blurs and deteriorates, which is inconvenient.

Conventionally, various image stabilizing apparatus for preventing observation images from being deteriorated due to fluctuations in the emission angle of luminous flux with respect to the optical axis due to the vibration and rocking transmitted to optical apparatus have been proposed.

For example, Japanese Patent Publication No. 57-37852 discloses binoculars comprising therein anti-vibration means utilizing a rotary inertial member (gyro motor) in order to correct the blur of observation images in the binoculars.

Namely, according to this technique, an erect prism is disposed on the optical axis between an objective lens and an eyepiece of the binoculars and is secured onto gimbal suspension means, such that the erect prism is held in substantially the same posture even when the binoculars are vibrated due to camera shake or the like, so as to prevent the observation image of binoculars from blurring.

In such a conventional technique utilizing a rotary inertial member and gimbal suspension means, while images can be stabilized with a high accuracy, a high-speed rotary member is required for yielding a large inertial force within a small space, and a high precision is needed since the vibration generated by the rotary member itself has to be reduced. Such demands for smaller size, higher speed, and higher precision are problematic in that they impose inconveniences in terms of cost, life, time required for attaining a necessary inertial force after the power is turned on, and the like. If the effective diameter of objective lenses is made greater along with the increase in power or resolution of binoculars, then the erect prism becomes larger, whereby a large inertial force is required, which enhances the above-mentioned problems, and the power consumption increases along therewith.

Therefore, the assignee of the present application has proposed an image stabilizing apparatus (Japanese Unexamined Patent Publication No. 6-250100) in which an angular velocity sensor is mounted to gimbal suspension means in place of the above-mentioned rotary inertial member, and the pivoting of the gimbal suspension means is controlled according to the output value from the angular velocity sensor, so as to fix the posture of the erect prism with respect to the earth (inertial system). According to this apparatus, the erect prism held with the gimbal suspension means basically has an inertial force. In particular, its posture-keeping capability against vibrations with a relatively large amplitude is high with respect to high-speed vibrations with a high vibration frequency. Therefore, the control power for the rotational position according to the angular velocity sensor can be kept small. In other image stabilizing apparatus which drive vari-angle prisms or lenses, however, active driving sections are needed, and it is necessary for the driving sections to be operated at a high speed in order to correct large amplitude in high-frequency vibrations, whereby correction in a wide angle range is difficult.

The above-mentioned gimbal suspension means is pivoted by an actuator such as motor about two pivotal axes extending sidewise and vertical directions of the optical apparatus, respectively. The actuator is driven by PWM control, which is excellent in response and is favorable in terms of power utilization efficiency. When it is driven by PWM control as such, however, there are problems as follows.

Namely, while driving control is carried out by charging and discharging a capacitor in PWM control, neither charging nor discharging of the capacitor is effected if the angular position of gimbal suspension means does not change. Therefore, immediately after starting the image-stabilizing control, in the vibration-free state, or the like, the direction for driving the actuator may not be fixed, whereby it is problematic in that the response of PWM control cannot be enhanced.

SUMMARY OF THE INVENTION

In view of such circumstances, it is an object of the present invention to provide an image stabilizing apparatus which can enhance the response in control for stabilizing images.

In a first aspect, the present invention provides an image stabilizing apparatus mounted in an optical apparatus having a monocular or binocular optical system in which an erect prism is disposed between an objective lens and an eyepiece, whereas the objective lens and eyepiece of the optical system are secured within a case;

the image stabilizing apparatus comprising:

gimbal suspension means comprising inner and outer gimbals, adapted to pivotally attach the erect prism to the case, having two pivotal axes extending sidewise and vertical directions of the optical apparatus, respectively;

an actuator for pivoting the gimbal suspension means about the two pivotal axes;

pivoting control means for driving the actuator so as to fix the erect prism with respect to an inertial system and controlling the pivoting of the gimbal suspension means about the two pivotal axes; and one-side stressing means, disposed between the inner and outer gimbals, for pivotally stressing the inner gimbal with respect to the outer gimbal in one direction.

In a second aspect, the present invention provides an image stabilizing apparatus mounted in an optical apparatus having a monocular or binocular optical system in which an erect prism is disposed between an objective lens and an eyepiece, whereas the objective lens and eyepiece of the optical system are secured within a case;

the image stabilizing apparatus comprising:

gimbal suspension means comprising inner and outer gimbals, adapted to pivotally attach the erect prism to the case, having two pivotal axes extending sidewise and vertical directions of the optical apparatus, respectively;

an actuator for pivoting the gimbal suspension means about the two pivotal axes;

pivoting control means for driving the actuator so as to fix the erect prism with respect to an inertial system and controlling the pivoting of the gimbal suspension means about the two pivotal axes; and one-side stressing means, disposed between the outer gimbal and the case, for pivotally stressing the outer gimbal with respect to the case in one direction.

In each of the above-mentioned aspects, it is particularly effective if the pivoting control means carries out the pivoting control by use of PWM control.

Preferably, the image stabilizing apparatus further comprises caging means for restricting relative pivoting between the inner and outer gimbals or between the outer gimbal and the case when the pivoting control means carries out no pivoting control (image stabilizing control).

In the image stabilizing apparatus, the one-side stressing means is not restricted to any particular configuration as long as it can pivotally stress the inner gimbal to the outer gimbal or the outer gimbal to the case in one direction. For example, a torsion coil spring attached to a pivotal axis can be employed.

DESCRIPTION OF THE PREFERRED EMBODIMENTS

Figure 1:
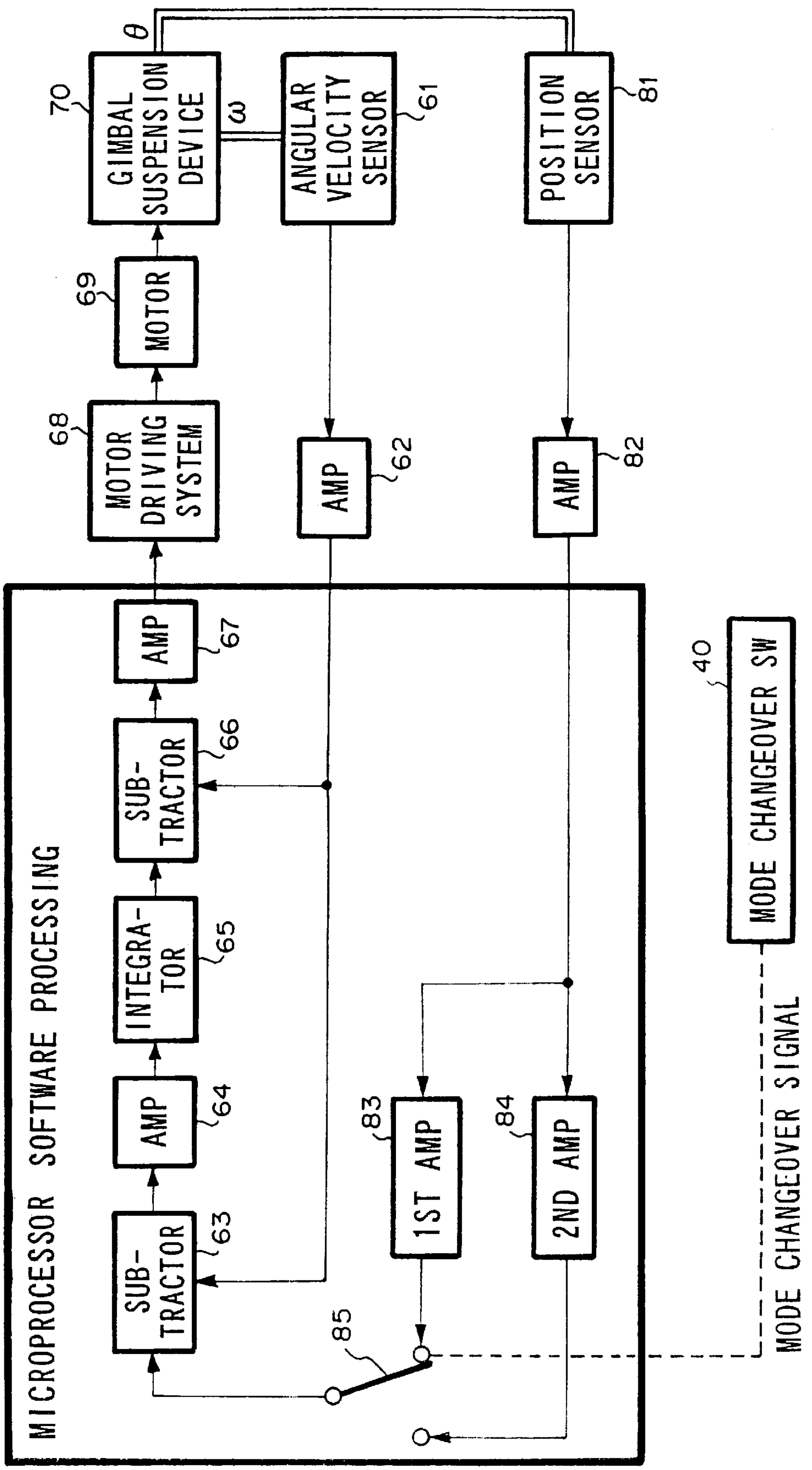
FIG. 1 is a block diagram showing a control loop of the image stabilizing apparatus in accordance with an embodiment of the present invention.

In the following, an embodiment of the present invention will be explained with reference to the drawings.

FIGS. 2 to 5 are a sectional view taken along a horizontal plane, frontal sectional view, lateral sectional view, and perspective view showing the state where the image stabilizing apparatus in accordance with an embodiment of the present invention is incorporated in binoculars, respectively. As depicted, the binoculars in which the image stabilizing apparatus 20 of this embodiment is incorporated in a case 30 comprise a pair of objective lens systems 1*a,* 1*b;* a pair of eyepiece systems 2*a,* 2*b;* and a pair of erect prisms 3*a,* 3*b.* The objective lens 1*a,* eyepiece 2*a,* and erect prism 3*a* constitute a first telescope system 10*a*. Similarly, the objective lens 1*b,* eyepiece 2*b,* and erect prism 3*b* constitute a second telescope system 10*b.* The first and second telescope systems 10*a,* 10*b* as a pair constitute a binocular system.

A pair of objective lens systems 1*a,* 1*b* and a pair of eyepieces 2*a,* 2*b,* constituting the binocular system, are secured to the case 30 of the optical apparatus. The erect prisms 3*a,* 3*b* are pivotally attached to the case 30 by way of gimbal suspension members 7, 107 having pivotal axes 6, 106 (see FIG. 6) extending in the vertical direction of the apparatus (the direction orthogonal to both the optical axis and aligning direction of objective lens systems 1*a,* 1*b*) and the sidewise direction of the apparatus (the aligning direction of objective lenses 1*a,* 1*b*), respectively.

Also, the back side of the case 30 is provided with a main switch 50 and a gain changeover instruction switch 40 which enables the switching of gain, in a control loop which will be explained later, to be operated from the outside.

In the following, fundamental functions on which the apparatus in accordance with this embodiment is based will be explained with reference to FIGS. 6 and 7. In this specification, the vertical direction of apparatus refers to the direction of arrow A in FIG. 6, whereas the sidewise direction of apparatus refers to the direction of arrow C in FIG. 6.

Figure 6:
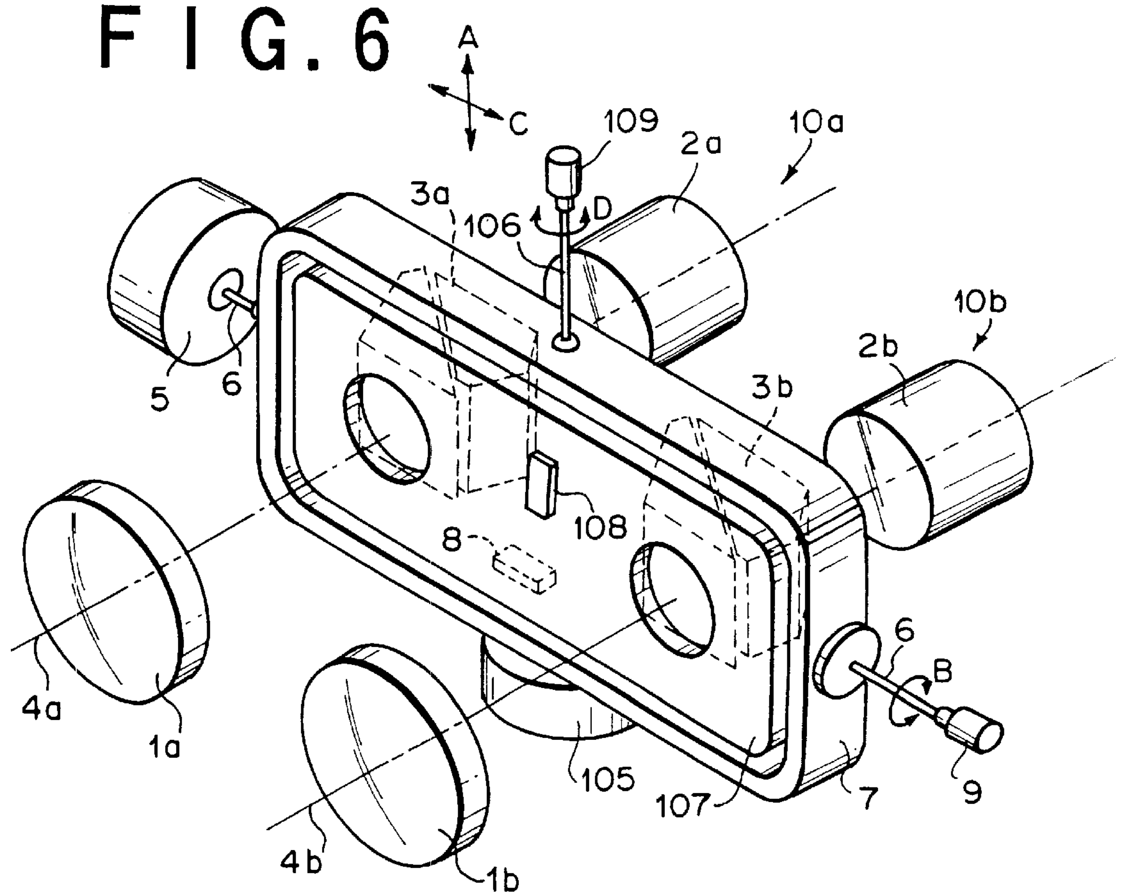
FIG. 6 is a schematic perspective view for explaining functions of the image stabilizing apparatus in accordance with the embodiment of the present invention.
Figure 7:
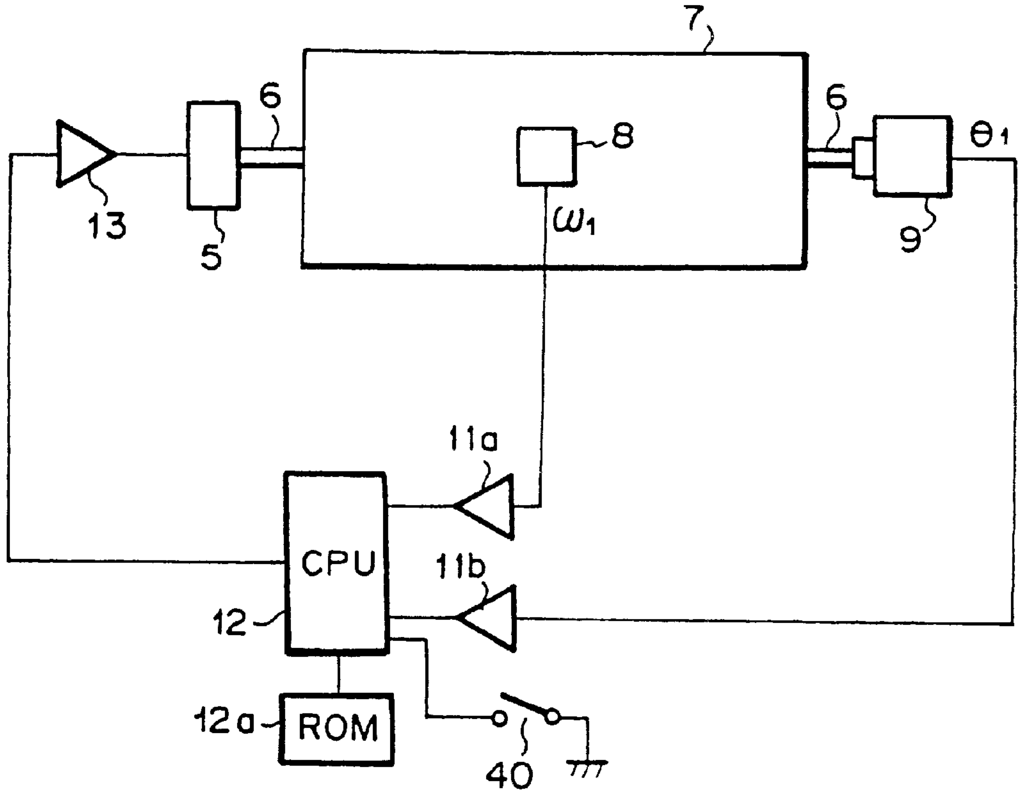
FIG. 7 is a block diagram for explaining functions of the image stabilizing apparatus in accordance with the embodiment of the present invention.

The optical apparatus attains a configuration of a common binocular system in the state where the gimbal suspension members 7, 107 having the above-mentioned erect prisms 3*a,* 3*b* attached thereto are fixed with respect to the case 30, i.e., where the erect prisms 3*a,* 3*b* attached to the gimbal suspension members 7, 107 are resultantly secured to the case 30, in FIG. 6. The respective optical axes 4*a,* 4*b* of the telescope optical systems 10*a,* 10*b* at this time will be referred to as optical axes of the optical apparatus.

Appropriate positions for disposing the objective lens systems 1*a,* 1*b;* erect prisms 3*a,* 3*b;* gimbal suspension members 7, 107; pivotal axes 6, 106; and the like are explained in detail in known literatures (e.g., Japanese Patent Publication No. 57-37852) and will not be repeated here.

In the apparatus of this embodiment, as shown in FIG. 6, the inner gimbal suspension member 107 is axially supported by the outer gimbal suspension member 7, so that the gimbal suspension device has an inner/outer double structure. While the outer gimbal suspension member 7 is pivoted by the pivotal axis 6 extending in the sidewise direction of the apparatus, so as to correct the blurring of images with respect to the vertical direction; the inner gimbal suspension member 107 is pivoted by the pivotal axis 106 extending in the vertical direction of the apparatus, so as to correct the blurring of images with respect to the sidewise direction. The erect prisms 3*a,* 3*b* are attached to the inner gimbal suspension member 107. In FIG. 6, the vertical relationship is shown opposite to that in FIGS. 2 to 5.

An angular velocity sensor 8 is secured to the center part of the upper wall portion of the outer gimbal suspension member 7, whereas an angular velocity sensor 108 is secured to the center part of the front wall portion of the inner gimbal suspension member 107. The angular velocity sensor 8 is a sensor which detects, when the outer gimbal suspension member 7 pivots in the direction of arrow B along with the vertical fluctuation of the case 30, its rotational angular velocity $\omega_1$. On the other hand, the angular velocity sensor 108 is a sensor which detects, when the inner gimbal suspension member 107 pivots in the direction of arrow D along with the sidewise fluctuation of the case 30, its rotational angular velocity $\omega_2$.

For carrying out positional feedback control in addition to the velocity feedback control based on the detected angular velocity, a position sensor 9 for detecting the rotational angle $\theta_1$ of the pivotal axis 6 is attached to one end of the pivotal axis 6. Attached to the other end of the pivotal axis 6 is a rotary motor 5 for pivoting the pivotal axis 6 of the gimbal suspension member 7 so as to cause the erect prisms 3*a,* 3*b* to always restore their initial postures against the fluctuation of the case 30 according to the detected values from the angular velocity sensor 8 and position sensor 9. On the other hand, for carrying out positional feedback control in addition to the velocity feedback control based on the detected angular velocity, a position sensor 109 for detecting the rotational angle $\theta_2$ of the pivotal axis 106 is attached to one end of the pivotal axis 106. Attached to the other end of the pivotal axis 106 is a rotary motor 105 for pivoting the pivotal axis 106 of the gimbal suspension member 107 so as to cause the erect prisms 3*a,* 3*b* to always restore their initial postures against the fluctuation of the case 30 with respect to the sidewise direction according to the detected values from the angular velocity sensor 108 and position sensor 109.

Figure 2:
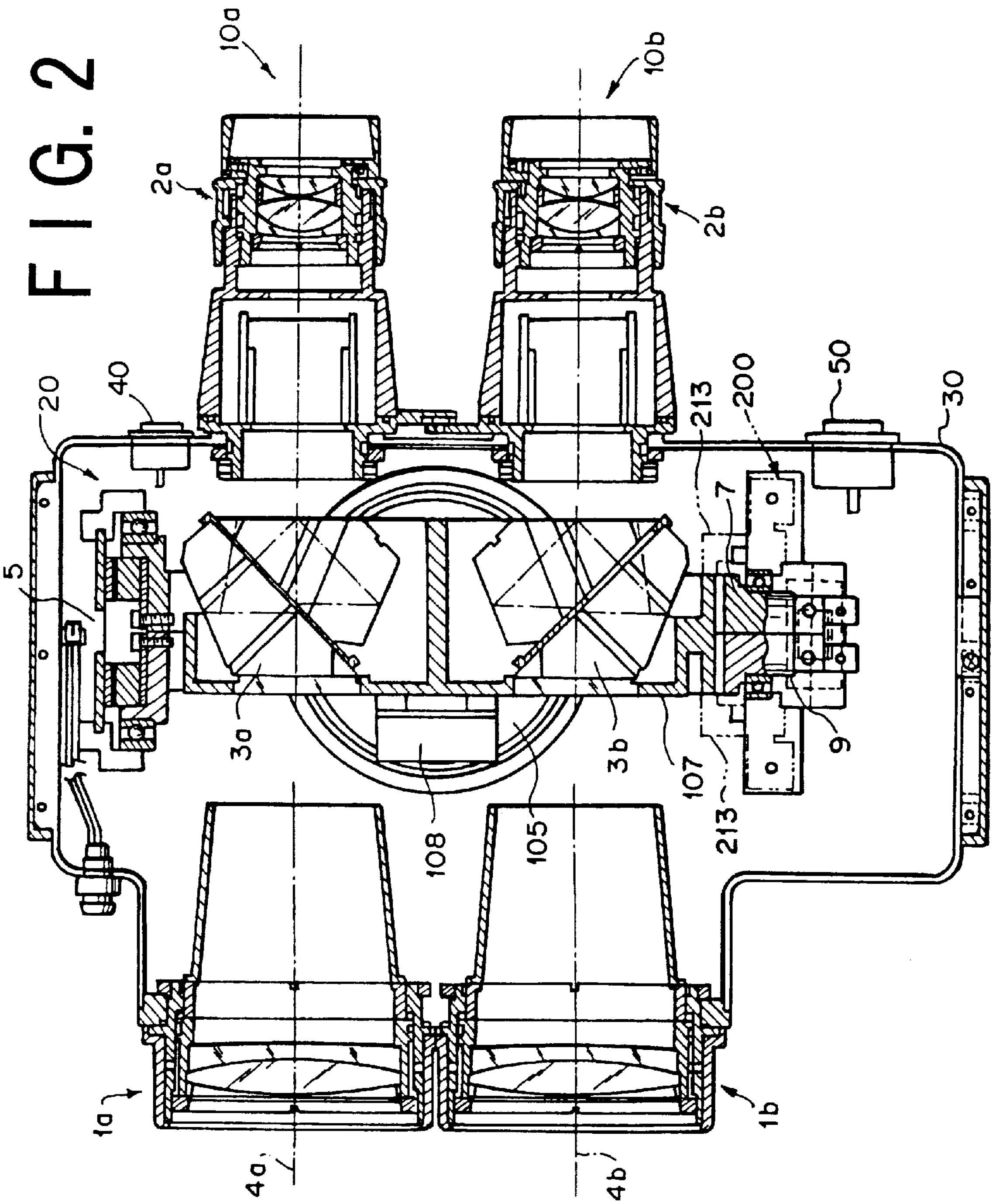
FIG. 2 is a sectional view, taken along a horizontal plane, showing binoculars incorporation therein the image stabilizing apparatus in accordance with the embodiment of the present invention.
Figure 3:
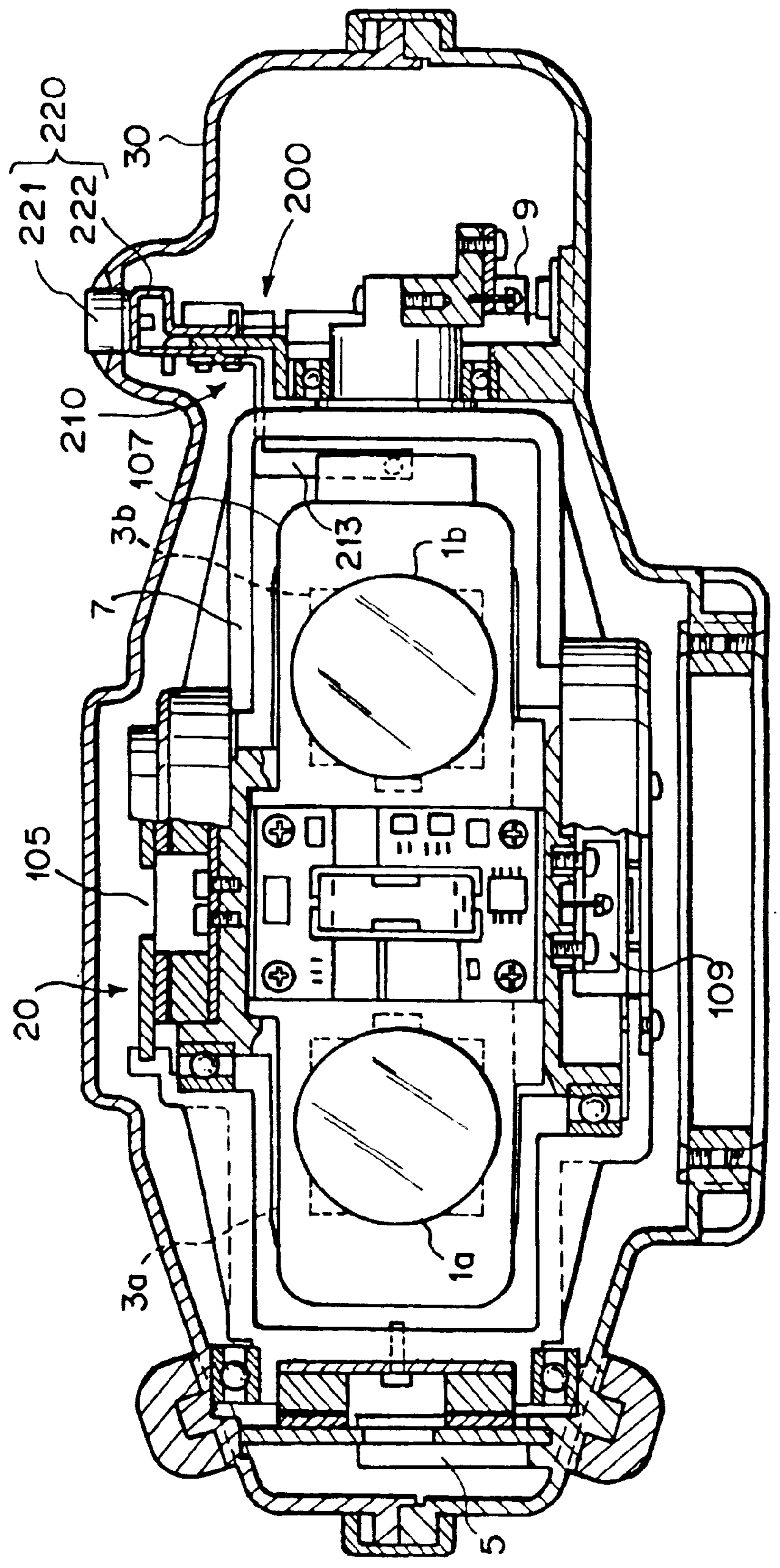
FIG. 3 is frontal sectional view showing the binoculars incorporating therein the image stabilizing apparatus in accordance with the embodiment of the present invention.
Figure 4:
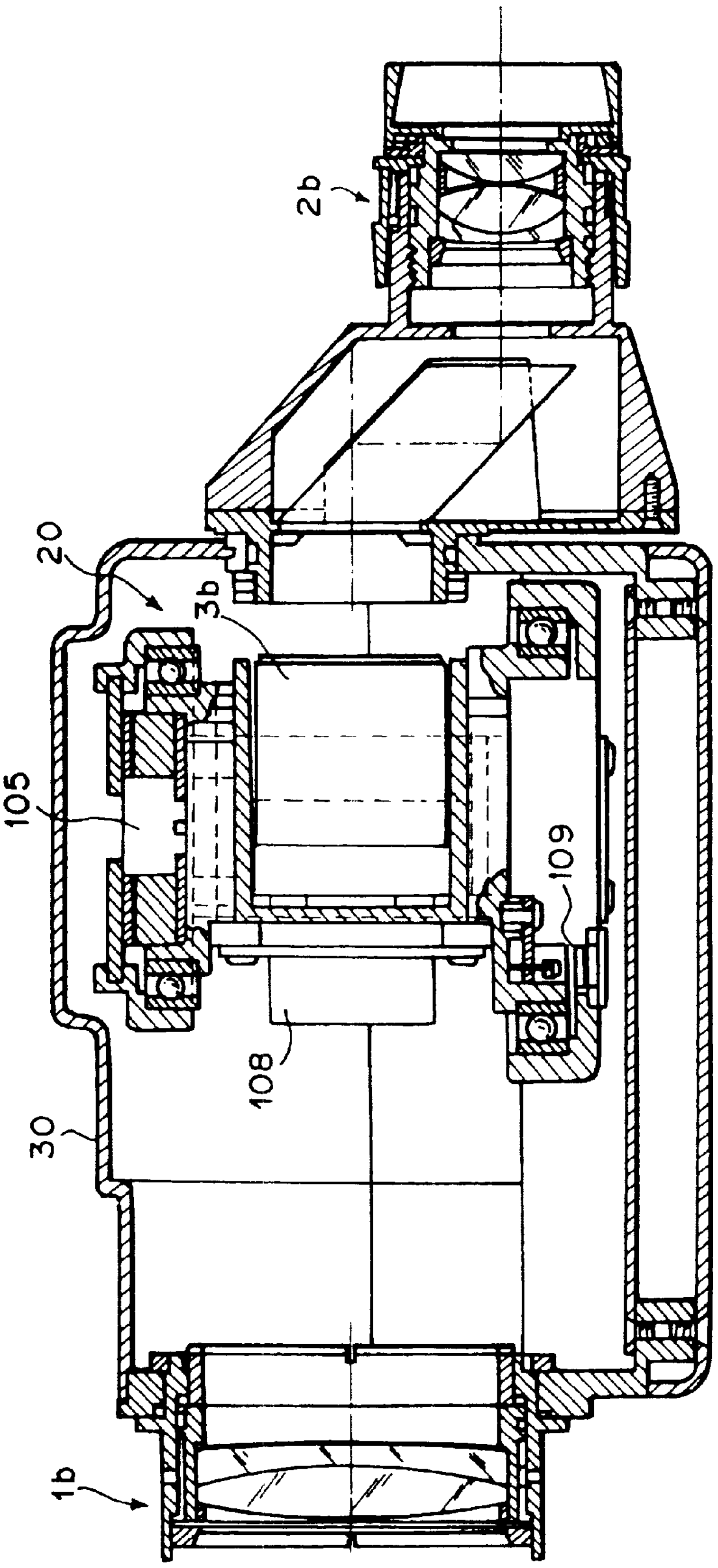
FIG. 4 is lateral sectional view showing the binoculars incorporating therein the image stablizing apparatus in accordance with the embodiment of the present invention.
Figure 5:
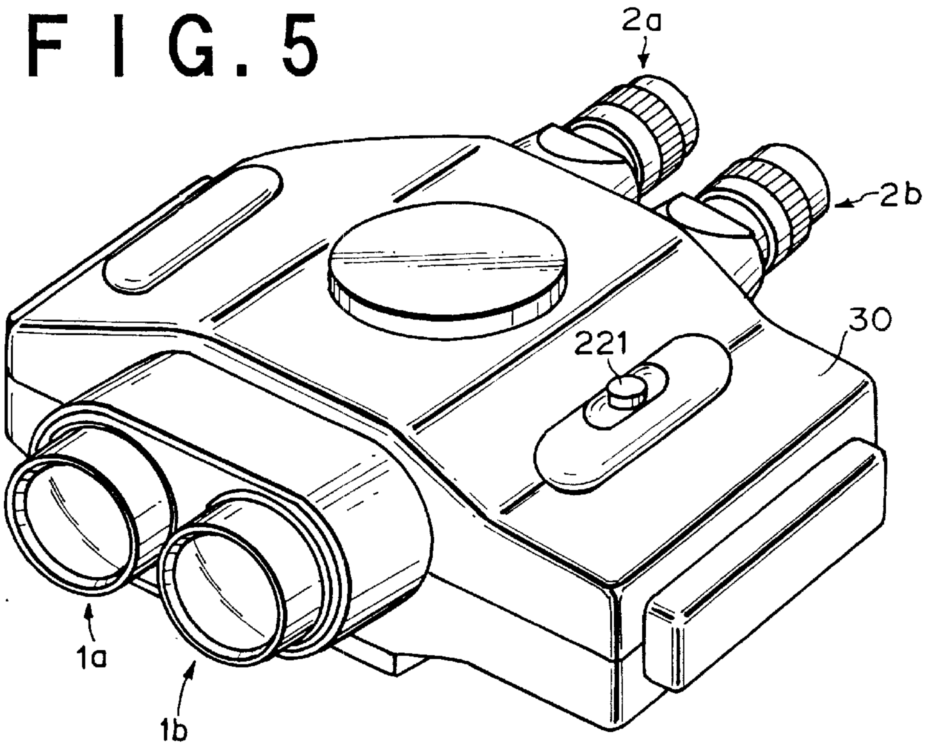
FIG. 5 is a perspective view showing the binoculars incorporating therein the image stabilizing apparatus in accordance with the embodiment of the present invention.

As can be seen from FIGS. 2 and 3, one end portion of the gimbal suspension members 7, 107 in the case 30 is provided with a caging means 200 for restricting the pivoting of the gimbal suspension members 7, 107 so as to prevent them from being damaged when the image stabilizing control, which will be explained later, is not carried out.

The caging means 200 is constituted by a pivoting restriction mechanism 210 comprising a pair of support levers 213 for holding both of the gimbal suspension members 7, 107 simultaneously therebetween and thereby restricting their pivoting; and a pressing member 220 linked to the pivoting restriction mechanism 210. The pressing member 220 is constituted by a button projecting to the outside from the upper part of the case 30, and a pressing piece 222 supporting the button 221 and extending downward. For facilitating operations of pressing the button 221, the case 30 is formed such that its part surrounding the pressing member 220 bulges upward, whereas the area near the button 221 in the top part is recessed.

If the button 221 is pushed in the caging means 200, then the image stabilizing control is started, and the pivoting restriction mechanism 210 cancels its restriction on pivoting. If the button 221 is pushed again, then the image stabilizing control is terminated, and the pivoting restriction mechanism 210 restricts pivoting.

Figure 9:
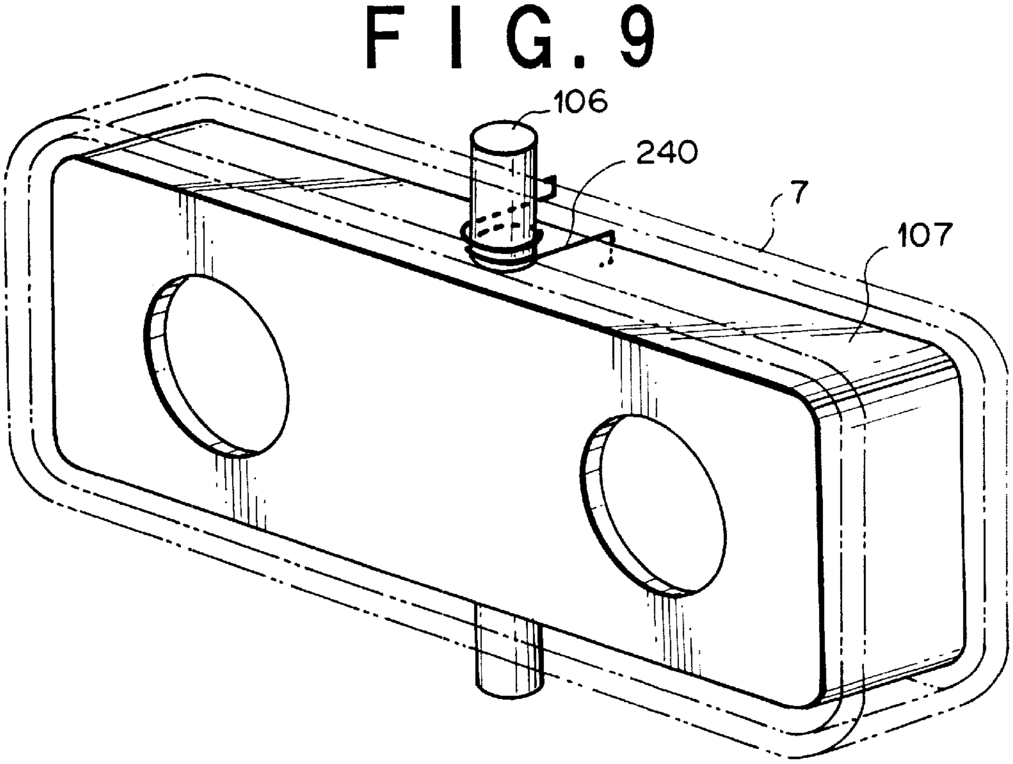
FIG. 9 a perspective view showing a main part of the binoculars incorporating therein the image stabilizing apparatus in accordance with the embodiment of the present invention.
Figure 10:
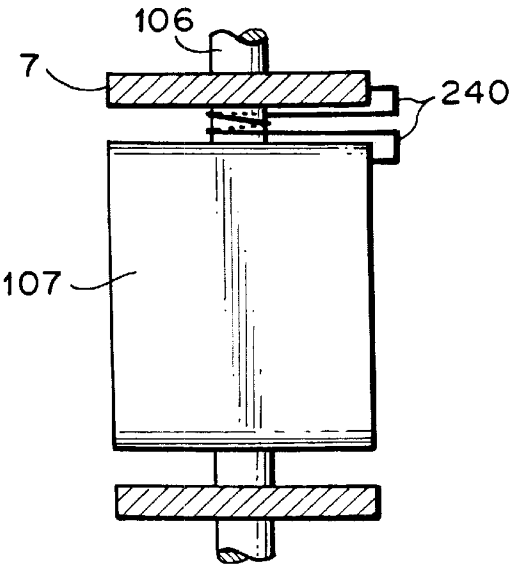
FIG. 10 is a lateral sectional view of FIG. 9.

As shown in FIGS. 9 and 10, a torsion coil spring 240 is disposed between the gimbal suspension member 107 (inner gimbal) and gimbal suspension member 7 (outer gimbal). The torsion coil spring 240 is disposed so as to be wound about the pivotal axis 106, whereas its both end portions engage the respective gimbal suspension members 7, 107. Due to the elastic force of the torsion coil spring 240, the gimbal suspension member 107 is pivotally stressed with respect to the gimbal suspension member 7 in one direction. The torsion coil spring 240 is disposed such that the pivotal stressing force acts on the gimbal suspension member 107 within the range not exceeding the maximum pivotal angle (about 10° at the total width) of the gimbal suspension member 107 upon image stabilizing control. For keeping excess load from being applied to the rotary motor 105 upon image stabilizing control, the spring constant of the torsion coil spring 240 is set to a sufficiently small value.

Also, a torsion coil spring (not depicted) similar to the torsion coil spring 240 is disposed between the gimbal suspension member 7 (outer gimbal) and the case 30, such that the elastic force of this torsion coil spring pivotally stresses the gimbal suspension member 7 with respect to the case 30 in one direction.

A basic concept of control loop in the apparatus of this embodiment will now be explained with reference to FIG. 7.

As depicted, this apparatus comprises amplifiers 11*a,* 11*b* for amplifying the angular velocity signal from the angular velocity sensor 8 and the angular signal from the position sensor 9, respectively; a CPU 12 for computing the amount of driving of the rotary motor 5 so as to cause the erect prisms 3*a,* 3*b* to restore their original postures according to the angular velocity signal and angular signal and outputting a control signal based on this computation; and a motor driving circuit 13 for amplifying the control signal from the CPU 12 and driving the rotary motor 5. The driving control of the rotary motor 5 in the CPU 12 is carried out by PWM (Pulse Width Modulation) control which is excellent in response and favorable in terms of power utilization efficiency.

Connected to the CPU 12 are a ROM 12*a* storing various kinds of programs, and the gain changeover instruction switch 40 for instructing the CPU 12 to change the gain in the control loop. As with the detected signals from the angular velocity sensor 8 and position sensor 9, the detected signals from the angular velocity sensor 108 and position sensor 109 are converted into a control signal by a control loop similar to that shown in FIG. 7, and the rotary motor 105 is driven by this control signal.

Therefore, while two sets of control loops are necessary for causing the two, i.e., inner and outer, gimbal suspension members 7, 107 to restore their original postures in the apparatus of this embodiment, the CPU 12 may be used in common.

A detailed configuration of the control loop will now be explained with reference to FIG. 1.

This control loop is constituted by two feedback loops, i.e., a velocity (angular velocity) feedback loop and a positional (angle) feedback loop. Also, this control loop is constituted by a combination of a software loop constructed by micorprocessor programs in the CPU 12, and a hardware loop.

First, the velocity feedback loop detects the angular velocity ω of a gimbal suspension device 70 (7, 107) about the pivotal axis 6, 106 with an angular velocity sensor 61 (8, 108). Thus detected value ω is amplified by a hardware amplifier 62 and then is negatively fed back to a motor driving system 68 (first velocity feedback loop). As a consequence, an opposite rotational torque is generated in a motor 69, whereby control is effected such that the gimbal suspension device 70 restores its original posture against vibrations such as camera shake, i.e., the erect prisms 3*a*, 3*b* are secured with respect to the earth (inertial system) with respect to vibrations with a large angular velocity.

Also, in this velocity feedback loop, the value detected by the angular velocity sensor 61 is fed into an integrator 65 by way of a subtractor 63 and an amplifier 64. Then, in a subtractor 66, the detected value directly fed from the amplifier 62 is subtracted from the output value of the integrator 65, and the result of subtraction is negatively fed back through amplifier 67 to the motor driving system 68 (second velocity feedback loop). Since the value detected by the angular velocity sensor 61 is negatively fed back by way of the integrator 65, the control system can function even when the offset is zero with respect to a velocity command, i.e., when a velocity input value and a velocity output value of the feedback loop are identical to each other. Also, since the loop gain can be duplexed, the gimbal suspension device 70 can be stabilized at a higher speed (stabilizing accuracy can be raised).

The integrator 65 functions to average input values, whereas its output value is subjected to subtraction with the detected angular velocity value in the subtractor 66. Therefore, the integrator 65 can be considered to have a damper function for preventing the first velocity feedback loop from oscillating.

On the other hand, the position feedback loop detects the angular position θ of the gimbal suspension device 70 about the pivotal axis 6, 106 with a position sensor 81 (9, 109), amplifies thus detected value with a hardware amplifier 82, and then sends back thus amplified value to the motor driving system 68, thereby controlling the rotary motor 69 (5, 105) such that the gimbal suspension device 70 approaches the angular position $\theta_0$ of the midpoint on the collimation axis.

There are cases where optical apparatus such as binoculars are greatly panned or tilted. When the above-mentioned velocity feedback loop is used alone for control in such cases, its response to panning or tilting is unfavorable, whereby the gimbal suspension device 70 may pivot so greatly that it collides with the case 30 at a movable limit portion thereof.

Therefore, if it is detected that the gimbal suspension device 70 has pivoted greatly in this position feedback loop, then a signal corresponding to the detected value is sent back to the motor driving system 68, whereby the motor is driven so as to powerfully return the gimbal suspension device 70 toward the midpoint on the collimation axis.

As a consequence, upon panning, tilting, and the like, the gimbal suspension device 70 is prevented from unexpectedly colliding with the case 30 at movable limit portions thereof, and its tracking characteristic is made favorable when carrying out panning or tilting.

When binoculars are used in practice, flying objects such as birds and airplanes are often observed while being tracked. Fast pan/tilt operations, fast panning in particular, are required in such a case. Since it is necessary for the optical system in the apparatus to smoothly track the observation object in its moving direction, such a panning operation necessitates a function contradictory to the above-mentioned anti-vibration function for securing the optical system to its original position. Hence, it is rather necessary to nullify the above-mentioned anti-vibration function when carrying out such a pan/tilt operation. Since such a pan/tilt operation is carried out at any time as the observer needs it, it is desirable that a panning mode and an anti-vibration mode be switched therebetween by an operation of the observer, for example.

Therefore, in the apparatus of this embodiment, the back side of the case 30 is provided with the mode changeover switch (gain changeover instruction switch) 40, so that the gain of the above-mentioned control loop is changed according to the changeover of the switch 40, whereby the anti-vibration mode yielding a smaller gain in the control loop and the panning mode yielding a greater gain in the control loop can be switched therebetween.

Namely, the velocity feedback loop is mainly aimed at the anti-vibration function, whereas the position feedback loop is mainly aimed at a pan/tilt function which is a tracking function for the case 30.

Therefore, if the position feedback loop has a relatively greater feedback ratio, then the system mainly has the pan/tilt function. If the position feedback loop has a relatively smaller feedback ratio, by contrast, then the system mainly has the anti-vibration function.

Hence, in the above-mentioned embodiment as shown in FIG. 1, a first amplifier 83 with a lower amplification factor and a second amplifier 84 with a higher amplification factor are disposed within the position feedback loop, so that, according to a switching operation of the mode changeover switch 40 effected by the operator, a lower gain mode in which the detected signal from the position sensor 81 is fed back by way of the first amplifier 83 and a higher gain mode in which the detected signal from the position sensor 81 is fed back by way of the second amplifier 84 are switched therebetween. The mode switching within the control loop is carried out by a software switch section 85 which changes the loop connection according to a mode changeover signal corresponding to the switching operation of the mode changeover switch 40 effected by the operator.

Namely, if the software switch section 85 is connected to the first amplifier 83, then the value fed into the subtractor 63 from the position feedback loop becomes smaller, whereby the input value from the velocity feedback loop becomes relatively greater, thus yielding the anti-vibration mode (lower gain mode), whereby the gimbal suspension device 70 can favorably be secured to the earth (inertial system) against vibrations such as camera shake.

If the software switch section 85 is connected to the second amplifier 84, by contrast then the value fed into the subtractor 63 from the position feedback loop becomes greater, whereby the input value from the velocity feedback loop becomes relatively smaller, thus yielding the pan/tilt mode (higher gain mode), whereby the tracking characteristic with respect to panning or tilting becomes favorable.

As mentioned above, the driving control of the rotary motors 5, 105 in the CPU 12 is carried out by PWM control in this embodiment. Though the driving control is effected by charging/discharging a capacitor in the PWM control, neither charging nor discharging of the capacitor is effected if the angular position of gimbal suspension means 7, 107 does not change. Therefore, immediately after starting the image-stabilizing control, the direction for driving the rotary motors 5, 105 is not fixed in general, whereby the response of PWM control cannot be enhanced.

In this regard, the torsion coil spring 240 is disposed between the gimbal suspension members 107 and 7 as one-side stressing means for pivotally stressing the gimbal suspension member 107 with respect to the gimbal suspension member 7 in one direction, and a similar torsion coil spring is disposed between the gimbal suspension member 7 and the case 30 in this embodiment. As a consequence, when image stabilizing control is started, the angular position of the gimbal suspension members 7, 107 instantly changes due to the elastic stressing force of the torsion coil spring 240 and the like, so that the capacitor is charged earlier, whereby the response of PWM control is enhanced.

Also, the caging means 200 restricts the pivoting of both the gimbal suspension members 7, 107 in this embodiment when no image stabilizing control is carried out. As a consequence, it will suffice if the torsion coil spring 240 or the like is disposed such that a pivotal stressing force acts on the gimbal suspension member 107 within the pivotal angle range of the gimbal suspension member 107 upon image stabilizing control. Hence, the spring constant of the torsion coil spring 240 or the like can be set to a sufficiently small value, whereby excess load can be prevented from being applied to the rotary motor 105 upon image stabilizing control.

Though one-side stressing means is constituted by the torsion coil spring 240 attached to the pivotal axis 6, 106 in this embodiment, other one-side stressing means can be used as a matter of course.

Figure 11A:
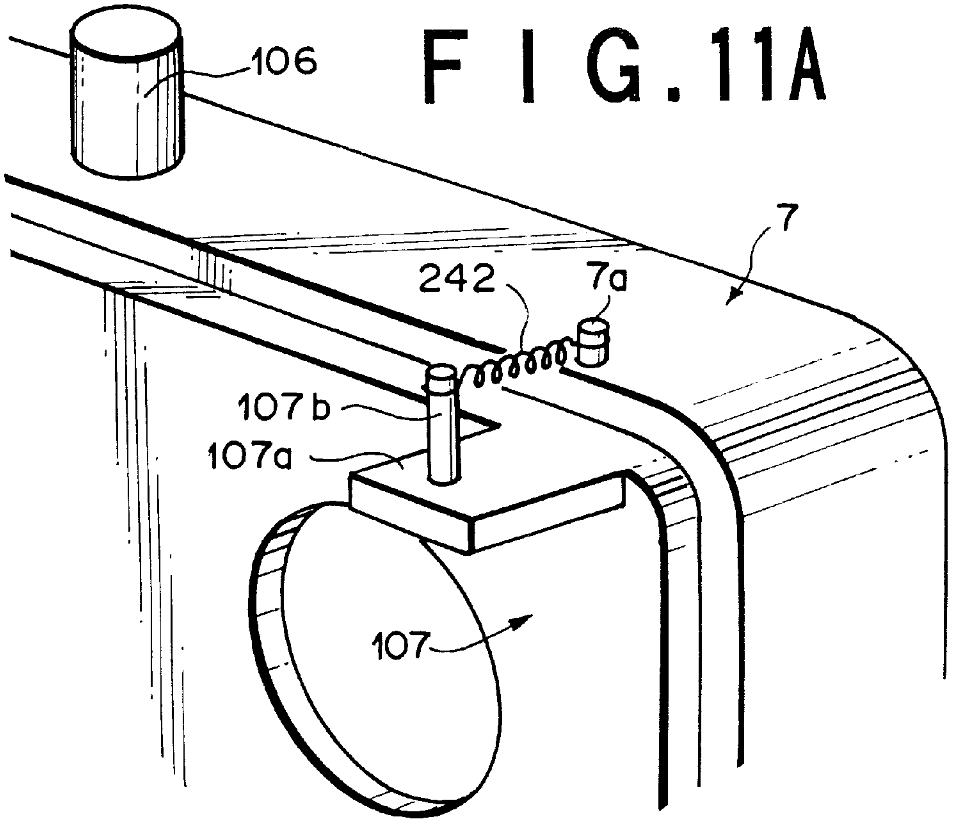
FIGS. 11A and 11B are perspective views each showing a main part of a modified example of the embodiment of the present invention.
Figure 11B:
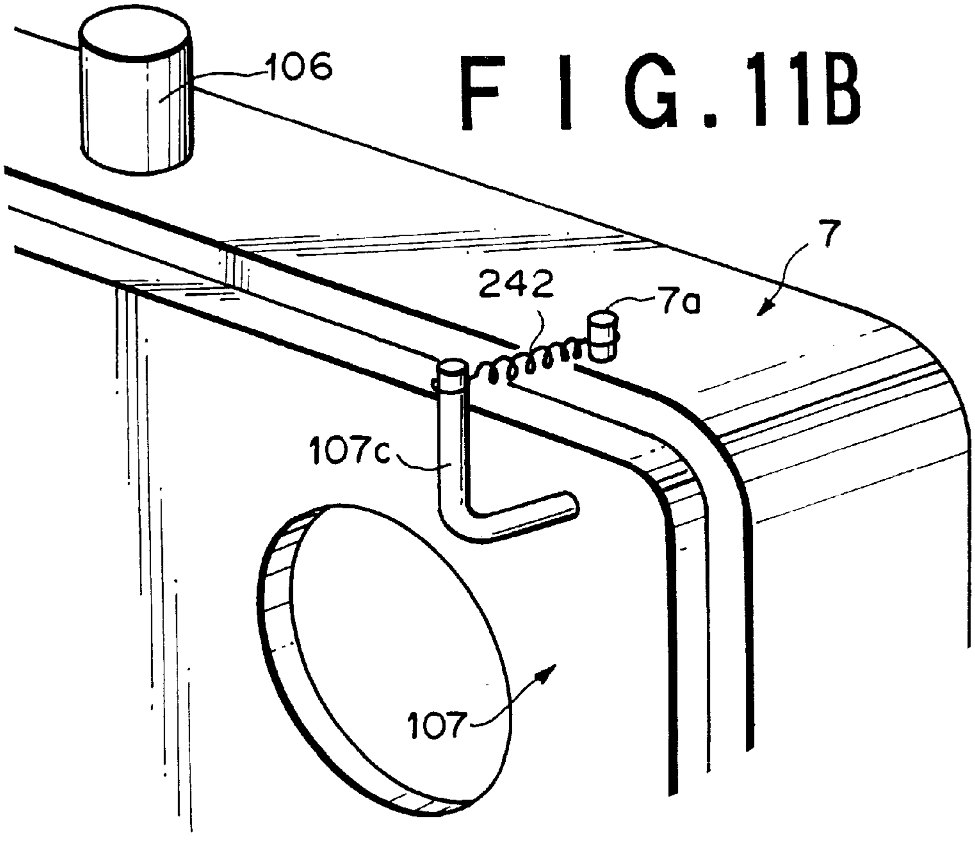

For example, as shown in FIGS. 11A and 11B, a tension coil spring 242 can be employed in place of the torsion coil spring 240.

The one-side stressing means shown in FIG. 11A is configured such that a tab 107*a* is formed at one end portion of the gimbal suspension member 107, a pin 107*b* vertically rises from the tab 107*a,* a pin 7*a* vertically rises from the gimbal suspension member 7, and the tension coil spring 242 bridges the pins 7*a,* 107*b,* thereby pivotally stressing the gimbal suspension member 107 with respect to the gimbal suspension member 7 in one direction.

The one-side stressing means shown in FIG. 11B is configured such that an L-shaped pin 107*c* vertically rises from one end portion of the gimbal suspension member 107, a pin 7*a* vertically rises from one end portion of the gimbal suspension member 7, and a tension coil spring 242 bridges the pins 7*a,* 107*c,* thereby pivotally stressing the gimbal suspension member 107 with respect to the gimbal suspension member 7 in one direction.

Figure 12:
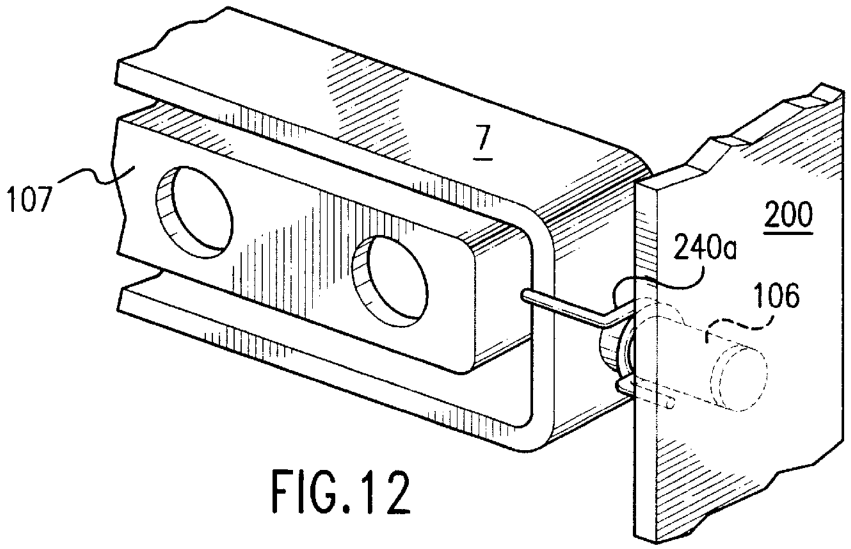
FIG. 12 shows an outer gimbal suspension means and spring 240*a*.
Figure 13:
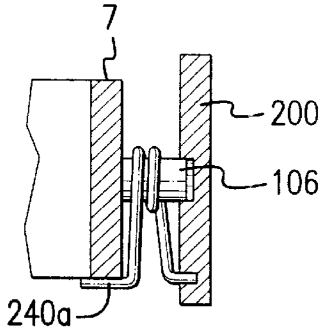
FIG. 13 shows another view of the outer gimbal suspension means with spring 240*a*.

FIG. 12 shows the gimbal suspension member 7 pivotally connected to a caging means 200 which has a spring 240*a* biasing the gimbal suspension member 7 with respect to the caging means 200. The spring 240*a* is a torsion coil spring wrapped around pivot posts or pivot pin 106. FIG. 13 shows a cross sectional view of the configuration of FIG. 12.

Figure 14:
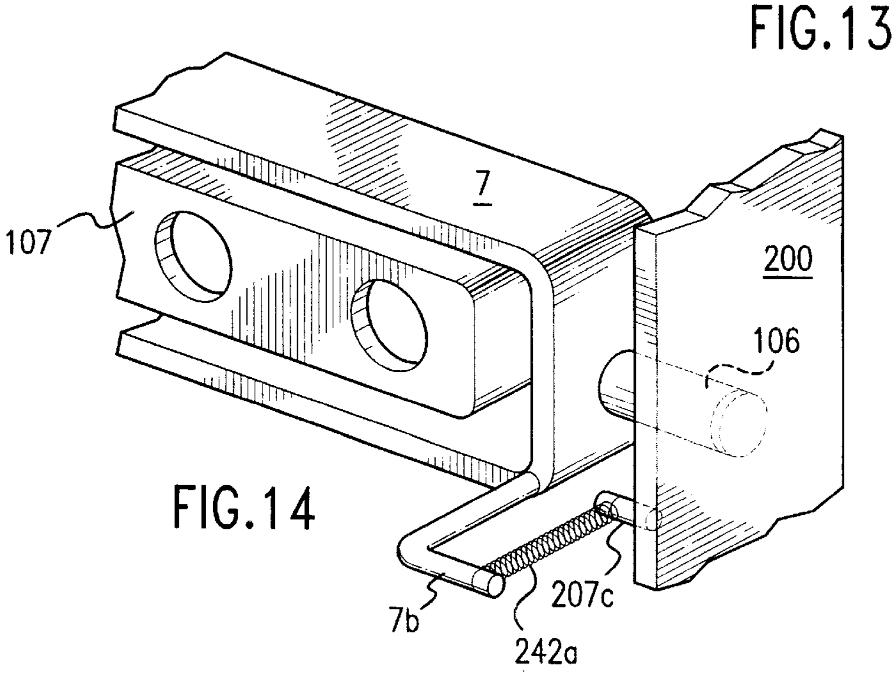
FIG. 14 shows another embodiment of the outer gimbal suspension with spring 242*a* which is a spring between suspension members 7*b* and 207*c*.

FIG. 14 shows another embodiment of the one side stressing means for pivotally stressing the gimbal suspension member 7 with respect to the caging means 200. Here a tension coil spring 242*a* is connected to an L-shaped pin 7*b* on the gimbal suspension member 7 and to a corresponding pivot pin 207*c* located on the caging means 200. The tension coil spring 242*a* provides the one side stressing means for stressing the gimbal suspension member 7 with respect to the caging 200.

Figure 8:
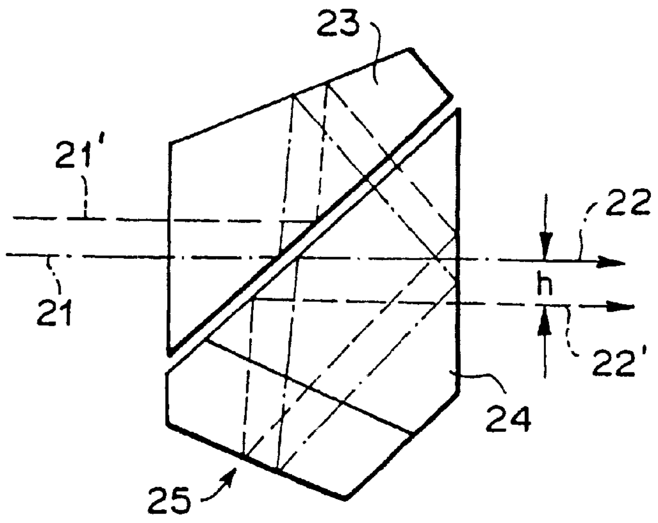
FIG. 8 is a side view for explaining an erect prism shown in FIG. 2.

Examples of the erect prisms 3*a,* 3*b* in this embodiment include Schmidt erect prisms, Abbe erect prisms, bauern fend erect prisms, porro erect prisms, and roof erect prisms. Among them, FIG. 8 shows a Schmidt erect prism. The Schmidt erect prism is constituted by prisms 23, 24 as depicted, whereas a part 25 of the prism 24 acts as a roof reflecting surface. In such an erect prism, there exists a position on the entrance optical axis where the entrance optical axis 21 and the exit optical axis 22 can be formed on the same line as depicted. Such an erect prism in which the entrance optical axis 21 and exit optical axis 22 can be formed on the same line has such a property that, as shown in FIG. 8, a light beam 21' which is parallel to the optical axis 21 and separated upward from the optical axis 21 by h becomes, after passing through the erect prism, a light beam 22' which is parallel to the optical axis 22 and separated downward from the optical axis 22 by h. Here, not only the prism in which the entrance optical axis and exit optical axis are formed on the same line, but also other prisms can be used as long as they are erect prisms.

The angular velocity sensor 8, 108 is a piezoelectric vibrating gyro sensor comprising a columnar vibrator which is shaped like a cylinder or the like and a plurality of piezoelectric ceramic pieces and utilizing Coriolis force, in which at least two piezoelectric ceramic pieces for detection and at least one piezoelectric ceramic piece for feedback are disposed on a side face of the columnar vibrator.

The piezoelectric ceramic pieces for detection output respective detection signals having values different from each other depending on the vibration. When their difference is computed, an angular velocity is obtained.

The piezoelectric ceramic for feedback is used for correcting the phase of detected signals.

Since the angular velocity sensor 8, 108 has a simple structure and a very small size, the image stabilizing apparatus 20 itself can attain a simple structure and a very small size. Also, since it has a high S/N ratio and a high precision, the angular velocity control can attain a high accuracy.

The image stabilizing apparatus of the present invention is not limited to the one in accordance with the above-mentioned embodiment, and can be modified in various manners. For example, as the angular velocity information detecting means, not only the piezoelectric vibrating gyro sensor of a columnar vibrator type, but also piezoelectric vibrating gyro sensors of various types such as a triangular prism vibrator type, a quadrangular prism vibrator type, and a tuning-fork-shaped vibrator type can be used. Further, various kinds of other angular velocity sensors can be used.

Though the driving control of rotary motors is carried out by PWM control in the above-mentioned embodiment, the present invention is also applicable to the driving control of rotary motors by use of operational amplifiers.

As the angular position detecting means, various angular sensors such as resolver, synchro, rotary encoder, and the like can also be used in place of the above-mentioned position sensor.

Though the apparatus of the above-mentioned embodiment has a configuration to be employed in binoculars, the image stabilizing apparatus of the present invention can have a configuration applicable to a monocular as well. Also, similar effects can be obtained when the apparatus is mounted to a camera such as video camera.

While the first image stabilizing apparatus of the present invention is configured such that an actuator for pivoting gimbal suspension means about two pivotal axes is driven so as to fix an erect prism with respect to an inertial system, one-side stressing means for pivotally stressing an inner gimbal with respect to an outer gimbal in one direction is disposed between the inner and outer gimbals constituting the gimbal suspension means, so that the angular position of the inner gimbal is instantly changed due to the stressing force of the one-side stressing means when image stabilizing control is started, whereby the capacitor is charged, which enhances the response of control of the driving motor.

While the second image stabilizing apparatus of the present invention is configured such that an actuator for pivoting gimbal suspension means about two pivotal axes is driven so as to fix an erect prism with respect to an inertial system, one-side stressing means for pivotally stressing an outer gimbal with respect to a case in one direction is disposed between the outer gimbal of the gimbal suspension means and the case, so that the angular position of the outer gimbal is instantly changed due to the stressing force of the one-side stressing means when image stabilizing control is started, whereby the capacitor is charged, which enhances the response of the driving motor.

Here, a configuration acting as both of the first and second image stabling apparatus as shown in the above-mentioned embodiment is further preferred.

What is claimed is:

1. An image stabilizing apparatus mounted in an optical apparatus having a monocular or binocular optical system in which an erect prism is disposed between an objective lens and an eyepiece, whereas said objective lens and eyepiece of said optical system are secured within a case;

said image stabilizing apparatus comprising:

gimbal suspension means comprising inner and outer gimbals, adapted to pivotally attach said erect prism to said case, having two pivotal axes extending sidewise and vertical directions of said optical apparatus, respectively;

an actuator for pivoting said gimbal suspension means about said two pivotal axes;

pivoting control means for driving said actuator so as to fix said erect prism with respect to an inertial system and controlling said pivoting of said gimbal suspension means about said two pivotal axes; and one-side stressing means, disposed between said inner and outer gimbals, for pivotally stressing said inner gimbal with respect to said outer gimbal in one direction.

2. An image stabilizing apparatus according to claim 1, wherein said pivoting control means carries out said pivoting control by use of PWM control.

3. An image stabilizing apparatus according to claim 1, further comprising caging means for restricting relative pivoting between said inner and outer gimbals when said pivoting control means carries out no pivoting control.

4. An image stabilizing apparatus according to claim 3, wherein said caging means comprises:

a pivoting restriction mechanism having a pair of support levers for holding said inner and outer gimbals simultaneously therebetween so as to restrict pivoting thereof; and a pressing member comprising a button, connected to said pivoting restriction mechanism, protruding to the outside of said case; and a pressing piece supporting said button and extending downward.

5. An image stabilizing apparatus according to claim 1, wherein said one-side stressing means is a torsion coil spring inserted between said inner and outer gimbals.

6. An image stabilizing apparatus according to claim 5, wherein said torsion coil is a spring attached to said pivotal axis.

7. An image stabilizing apparatus mounted in an optical apparatus having a monocular or binocular optical system in which an erect prism is disposed between an objective lens and an eyepiece, whereas said objective lens and eyepiece of said optical system are secured within a case;

said image stabilizing apparatus comprising:

gimbal suspension means comprising inner and outer gimbals, adapted to pivotally attach said erect prism to said case, having two pivotal axes extending sidewise and vertical directions of said optical apparatus, respectively;

an actuator for pivoting said gimbal suspension means about said two pivotal axes;

pivoting control means for driving said actuator so as to fix said erect prism with respect to an inertial system and controlling said pivoting of said gimbal suspension means about said two pivotal axes; and one-side stressing means, disposed between said outer gimbal and said case, for pivotally stressing said outer gimbal with respect to said case in one direction.

8. An image stabilizing apparatus according to claim 7, wherein said pivoting control means carries out said pivoting control by use of PWM control.

9. An image stabilizing apparatus according to claim 7, further comprising caging means for restricting relative pivoting between said outer gimbal and said case when said pivoting control means carries out no pivoting control.

10. An image stabilizing apparatus according to claim 7, wherein said one-side stressing means is a torsion coil spring inserted between said outer gimbal and said case.

11. An image stabilizing apparatus according to claim 10, wherein said torsion coil is a spring attached to said pivotal axis.

* * * * *